United States Patent [19]

Schober

[11] 4,025,706

[45] May 24, 1977

[54] COMPOSITION WITH PEROXIDES AND PROCESS FOR AVOIDING SCORCHING OF ETHYLENE POLYMER COMPOSITION

[75] Inventor: Donald Lincoln Schober, Belle Mead, N.J.

[73] Assignee: Union Carbide Corporation, New York, N.Y.

[22] Filed: Jan. 23, 1976

[21] Appl. No.: 651,835

Related U.S. Application Data

[63] Continuation-in-part of Ser. No. 527,853, Nov. 27, 1974, abandoned.

[52] U.S. Cl. .............................. 526/57; 260/47 UA; 427/117; 526/14; 526/16; 526/22
[51] Int. Cl.² ........................ C08F 8/06; C08J 3/24
[58] Field of Search .......... 260/94.9 GA, 86.7, 85.7, 260/88.25, 47 UA; 526/57, 14, 22, 16; 427/117; 450/623.5

[56] References Cited

UNITED STATES PATENTS

3,578,647  5/1971  Gregorian et al. ............... 260/86.7
3,661,877  5/1972  Bluestein et al. ................. 260/86.7

Primary Examiner—William F. Hamrock
Attorney, Agent, or Firm—James J. O'Connell

[57] ABSTRACT

Vulcanizable ethylene polymer based compositions which are susceptible to scorching when processed at elevated temperatures, prior to vulcanization, in the presence of bis(tertiary-butyl peroxy isopropyl) benzene and/or 2,5-dimethyl-2,5-di(tertiary butyl peroxy) hexane, are protected against such scorching by the incorporation therein of cumene hydroperoxide and/or tertiary butyl hydroperoxide.

44 Claims, 2 Drawing Figures

FIG. 2

COMPOSITION WITH PEROXIDES AND PROCESS FOR AVOIDING SCORCHING OF ETHYLENE POLYMER COMPOSITION

CROSS-REFERENCES TO RELATED PATENT APPLICATIONS

This patent application is a continuation-in-part of patent application Ser. No. 527,853 filed Nov. 27, 1974, now abandoned.

BACKGROUND OF THE INVENTION

1. Field of the Invention

The invention relates to the prevention of scorching, prior to vulcanization, of peroxide curable ethylene polymer based compositions.

2. Description of the Prior Art

Insulation compositions which are employed on electrical wire and cable are, in many cases, prepared from compositions which are based on vulcanizable, or cross-linkable, ethylene polymers. These ethylene polymer based compositions may be vulcanized, or cured or crosslinked, with various organic peroxide compounds, as disclosed for example in U.S. Pat. Nos. 2,826,570; 2,888,424; 2,916,481; 3,079,370 and 3,296,189.

In the organic peroxide compounds which have been used to date for commercial purposes in these vulcanizable ethylene polymer based compositions, each oxygen atom in the peroxide group, i.e., —O—O—, of such compounds is directly attached to a carbon atom of an organic radical. The commercially useful compositions do not employ hydroperoxide compounds therein as curing agents because they have relatively high decomposition temperatures, and the free radicals provided by the decomposed hydroperoxides are not effective for crosslinking ethylene polymers.

In order to process the organic peroxide containing compositions so as to adapt them to be placed, as insulation, on the electrical conductor components of the wire and cable it is usually necessary to admix the components of the compositions at high temperatures, and to extrude them, again at high temperatures, onto the electrical conductor. These processing activities occur prior to the intended vulcanization of the peroxide containing compositions, which is usually accomplished after such compositions are extruded onto the electrical conductor.

It has been found, however, that when certain of the organic peroxide compounds, such as dicumyl peroxide, as used in combination with certain types of ethylene polymers or in certain types of ethylene polymer based compositions, that the entire curable composition is susceptible to scorching during the high temperature processing thereof prior to the vulcanization of the composition on the electrical conductor. Scorching is, in effect, the premature vulcanization of the insulation composition. This premature vulcanization usually occurs, when it occurs, in the barrel or die head of the extruder in which the insulation composition is being processed, at elevated temperatures, prior to its being extruded onto an electrical conductor, and prior to its intended vulcanization. When an insulation composition is scorched in the extruder, the extruded composition will have imperfections in the form of discontinuity and roughness in the surface of the extrudate; and lumps or surface ripples caused by gel particles in the body of the extrudate. In addition, excessive scorching may cause enough of a pressure build-up in the extrusion device to require a cessation of the extrusion operation entirely.

The tendency of a composition to experience scorch is a relative matter, since any vulcanizable ethylene polymer based composition can be made to scorch if processed under the conditions designed to produce such result. Under a given set of conditions some compositions are more prone to scorching than are others.

Compositions which have been found to be more susceptible to scorching under a given set of conditions are those in which the ethylene polymer has a relatively low melt index and/or a relatively narrow molecular weight distribution.

The tendency of a composition to scorch under commercial operating conditions may be measured by means of the Monsanto Rheometer Test Procedure. The Monsanto Rheometer Test Procedure is described in ASTM-D-2084-71T.

Prior to the work of the present inventor as disclosed in this patent application, and three others filed on even date herewith, scorch prevention has been accomplished by the use of additives such as nitrites as disclosed in U.S. Pat. No. 3,202,648; the specific antioxidants and vulcanization accelerators disclosed in U.S. Pat. No. 3,335,124; and the chain transfer agents disclosed in U.S. Pat. No. 3,578,647. A mixture of two specific peroxides has also been used to provide a rate of cure that is intermediate the rate of cure of either of such peroxides, as disclosed in U.S. Pat. No. 3,661,877.

SUMMARY OF THE INVENTION

It has now been found that vulcanizable ethylene polymer based compositions which employ bis-(tertiary-butyl peroxy-isopropyl) benzene and 2,5-dimethyl-2,5-di(tertiary butyl peroxy)hexane as vulcanizing agents, and which compositions are susceptible to scorching under a given set of conditions, can be protected against scorching under such conditions by incorporating in such compositions cumene hydroperoxide and/or tertiary butyl hydroperoxide.

An object of the present invention is to provide scorch resistant, vulcanizable, ethylene polymer based compositions.

Another object of the present invention is to provide a process for protecting against scorching vulcanizable ethylene polymer based compositions which employ bis-(tertiary-butyl peroxy-isopropyl) benzene and 2,5-dimethyl-2,5-di(tertiary butyl peroxy)hexane as vulcanizing agents and which are susceptible to scorching.

A further object of the present invention is to provide scorch resistant insulation for electrical wire and cable.

A further object of the present invention is to provide a process whereby vulcanizable ethylene polymer based compositions which employ therein bis-(tertiary-butyl peroxy-isopropyl) benzene and 2,5-dimethyl-2,5-di(tertiary butyl peroxy)hexane as vulcanizing agents and which compositions are susceptible to scorching, may be processed in mixing and extruding devices, prior to the vulcanization thereof, at fast throughout rates and at relatively high processing temperatures without experiencing scorching.

These and other objects of the present invention are achieved by employing cumene hydroperoxide and/or tertiary butyl hydroperoxide as scorch preventing agents in the compositions of the present inventions.

DESCRIPTION OF THE PREFERRED EMBODIMENT

The Scorch Resistant Composition

The scorch resistant compositions of the present invention comprises, in weight ratio.

100 parts by weight of ethylene polymer, about 0.1 to 5.0, and preferably 0.2 to 2.0, parts by weight of a first peroxide which is bis (tertiarybutyl peroxy isopropyl) benzene and/or 2,5-dimethyl-2,5-di(tertiary butyl peroxy)hexane, and about 0.1 to 2.0, a preferably about 0.5 to 1.0, parts by weight of at least one hydroperoxide compound which is cumene hydroperoxide and/or tertiary butyl hydroperoxide.

About one part by weight of either or both of the hydroperoxides is used per 5 to 40 parts by weight of the first peroxide.

A minor amount, i.e., less than about 50 weight percent, of the first peroxide can be replaced by dicumyl peroxide.

Ethylene Polymer

The ethylene polymers which are used in the compositions of the present invention are solid (at 25° C.) materials which may be homopolymers, or copolymers, of ethylene. The ethylene copolymers contain at least 30 weight percent of ethylene and up to about 70 weight percent of propylene, and/or up to about 50 weight percent of one or more other organic compounds which are interpolymerizable with ethylene. These other compounds which are interpolymerizable with ethylene are preferably those which contain polymerizable unsaturation, such as is present in compounds containing an ethylene linkage, $>C = C<$. These other interpolymerizable compounds may be hydrocarbon compounds such as, butene-1, pentene-1, isoprene, butadiene, bicycloheptene, bicycloheptadiene and styrene, as well as vinyl compounds such as vinyl acetate and ethyl acrylate.

These compolymers could thus include those containing >0 to 70 weight percent of propylene and 30 to 21 100 weight percent of ethylene; and >0 to <50 weight percent of butene-1 or vinyl acetate and 50 to <100 weight percent of ethylene; and <0 to >30 weight percent of propylene, >0 to 20 weight percent of butene-1 and 50 to <100 weight percent of ethylene.

The ethylene polymers may be used individually, or in combination thereof. The ethylene polymers have a density (ASTM 1505 test procedure with conditioning as in ASTM D-1248-72) of about 0.86 to 0.96 and a melt index (ASTM D-1238 at 44 psi test pressure) of about 0.1 to 20 decigrams per minute.

Adjuvants

In addition to the ethylene polymer, and the peroxide compounds, the compositions of the present invention also advantageously include about 0.01 to 3.0 and, preferably 0.05 to 1.0, parts by weight of one or more suitable high temperature antioxidants for the ethylene polymers, per 100 parts by weight of ethylene polymer in such compositions.

These antioxidants are preferably sterically hindered phenols. Such compounds would include 1,3,5-trimethyl-2,4,6-tris(3,5-ditertiary butyl-4-hydroxy benzyl) benzene; 1,3,5-tris(3,5-ditertiary butyl -4-hydroxy benzyl)-5-triazine-2,4,6-(1H,3H,5H)trione; tetrakis-[methylene-3-(3′,5-di-t-butyl-4′-hydroxy phenyl)-propionate]methane; and di(2-methyl-4-hydroxy-5-t-butyl phenyl)sulfide. Polymerized 2,2,4-trimethyl dihydroquinoline may also be used.

Other adjuvants which may be employed in the compositions of the present invention would include adjuvants commonly employed in vulcanizable ethylene polymer based compositions including fillers, such as carbon black, clay, talc and calcium carbonate; blowing agents; nucleating agents for blown systems; lubricants; UV stabilizers; dyes and colorants; voltage stabilizers; metal deactivators and coupling agents.

These adjuvants would be used in amounts designed to provide the intended effect in the resulting composition.

The compositions of the present invention may also be extended, or filled, with polymers other than the ethylene polymer which are compatible, i.e., can be physically blended or alloyed, with the ethylene polymer. The resulting compositions should contain at least about 30 weight percent of interpolymerized ethylene in all the polymers that may be present in the composition, based on the total weight of the resulting composition. The other polymers which may be used would include polyvinyl chloride and polypropylene.

The total amount of adjuvants used will range from 0 to about 60 weight percent based on the total weight of the composition.

PROCESSING OF THE COMPOSITIONS

All of the components of the compositions of the present invention are usually blended or compounded together prior to their introduction into the extrusion device from which they are to be extruded onto an electrical conductor. The ethylene polymer and the other desired constituents may be blended together by any of the techniques used in the art to blend and compound thermoplastics to homogeneous masses. For instance, the components may be fluxed on a variety of apparatus including multi-roll mills, screw mills, continuous mixers, compounding extruders and Banbury mixers, or dissolved in mutual or compatible solvents.

When all the solids components of the composition are available in the form of a powder, or as small particles, the compositions are most conveniently prepared by first making a blend of the components, say in a Banbury mixer or a continuous extruder, and then masticating this blend on a heated mill, for instance a two-roll mill, and the milling continued until an intimate mixture of the components is obtained. Alternatively, a master batch containing the ethylene polymer(s) and the antioxidants(s) and, if desired, some or all of the other components, may be added to the mass of polymer. Where the ethylene polymer is not available in powder form, the compositions may be made by introducing the polymer to the mill, masticating it until it forms a band around one roll, after which a blend of the remaining components is added and the milling continued until an intimate mixture is obtained. The rolls are preferably maintained at a temperature which is within the range 80° C to 150° C and which is below the decomposition temperatures of the first peroxide compound(s). The composition, in the form of a sheet, is removed from the mill and then brought into a form, typically dice-like pieces, suitable for subsequent processing.

After the various components of the compositions of the present invention are uniformly admixed and blended together, they are further processed, in accordance with the process of the present invention, in conventional extrusion apparatus at about 120° to 160° C.

After being extruded onto a wire or cable, or other substrate, the compositions of the present invention are vulcanized at elevated temperatures of about ≤ 180° C. and preferably at ≤ 215°–230° C. using conventional vulcanizing procedures.

Derivation of Curing System Efficiency Factor

In the Monsanto Rheometer Test Procedure a sample of the vulcanizable composition is measured in a rheometer before the composition is subject to high temperature mixing or extrusion conditions. The test results are plotted as functions of inch-pounds of torque versus time. The compositions which are less susceptible to scorching are those that experience, after the minimum torque value is achieved, a delay in the rise of the torque values followed by a fast rise in the torque values to the level required for the intended end use of the composition being evaluated.

The Monsanto Rheometer Test Procedure is, in effect, a means for comparatively evaluating, graphically, the susceptibility of different vulcanizable compositions to scorch. In this way the use of different curing agents, or curing agent compositions, in such vulcanizable compositions, can also be graphically compared.

For the purposes of the present invention, a procedure has now been devised whereby, using the graphical results of Monsanto Rheometer Test procedures, the efficiency of different curable compositions, relative to the susceptibility of such compositions to scorching, can also be numerically compared. By using this new evaluation procedure, a separate and distinct numerical-efficiency factor (E) can be assigned to each curable composition. To make these efficiency factors more meaningful, for comparison purposes, they should be based on rheometer curves which are all obtained when the curable compositions being compared are evaluated under the same test conditions. In all the experiments reported herein the test samples were evaluated in a Monsanto Rheometer at a cure temperature of 360° F., using a rheometer oscillation of 110 CPM and an arc of ±5°.

There is also provided here below, the derivation of a numerical efficiency factor (E) for vulcanizable compositions. The derivation employs typical rheometer curves that were arbitrarily drawn, and which are not based on actual experiments. Such curves are shown in FIGS. 1 and 2 of the drawings.

Figure 1:
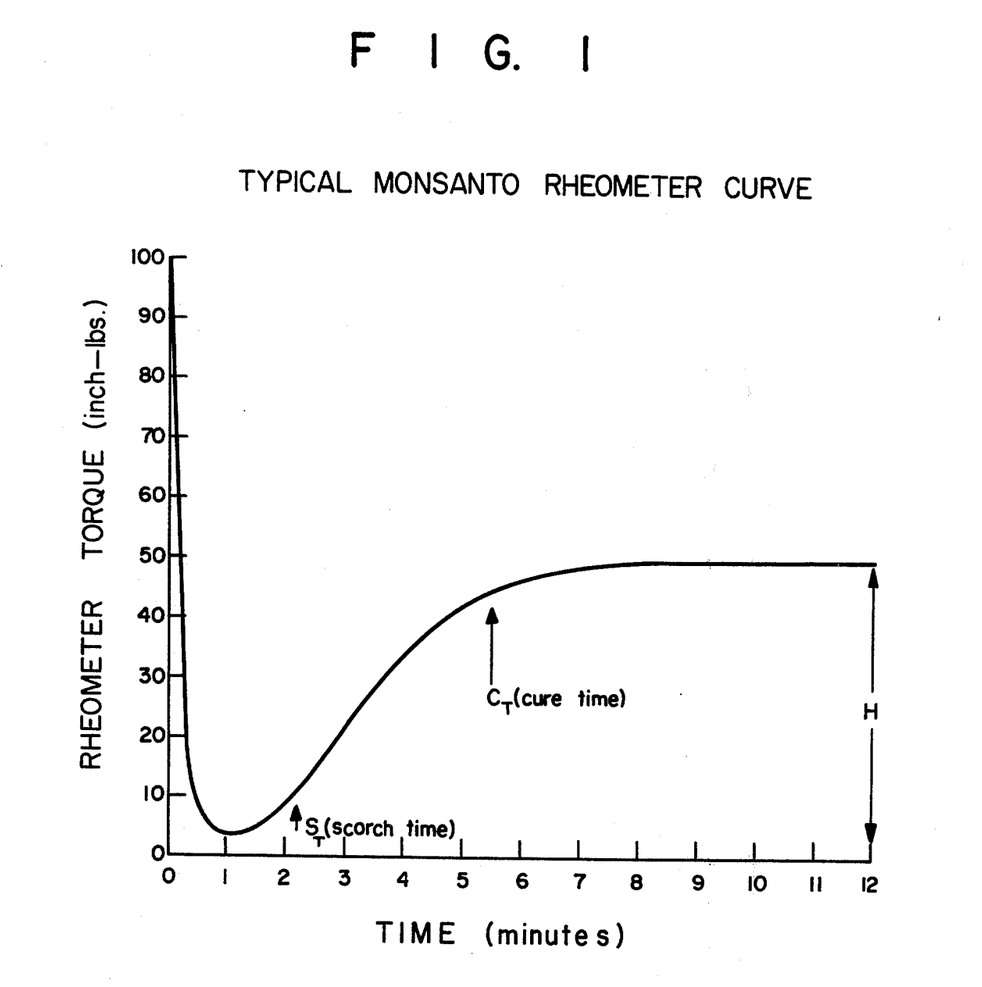
FIGS. 1 and 2 of the drawings show, graphically, Monsanto Rheometer Test curves which were used to illustrate the derivation of an efficiency factor as described below.
Figure 2:
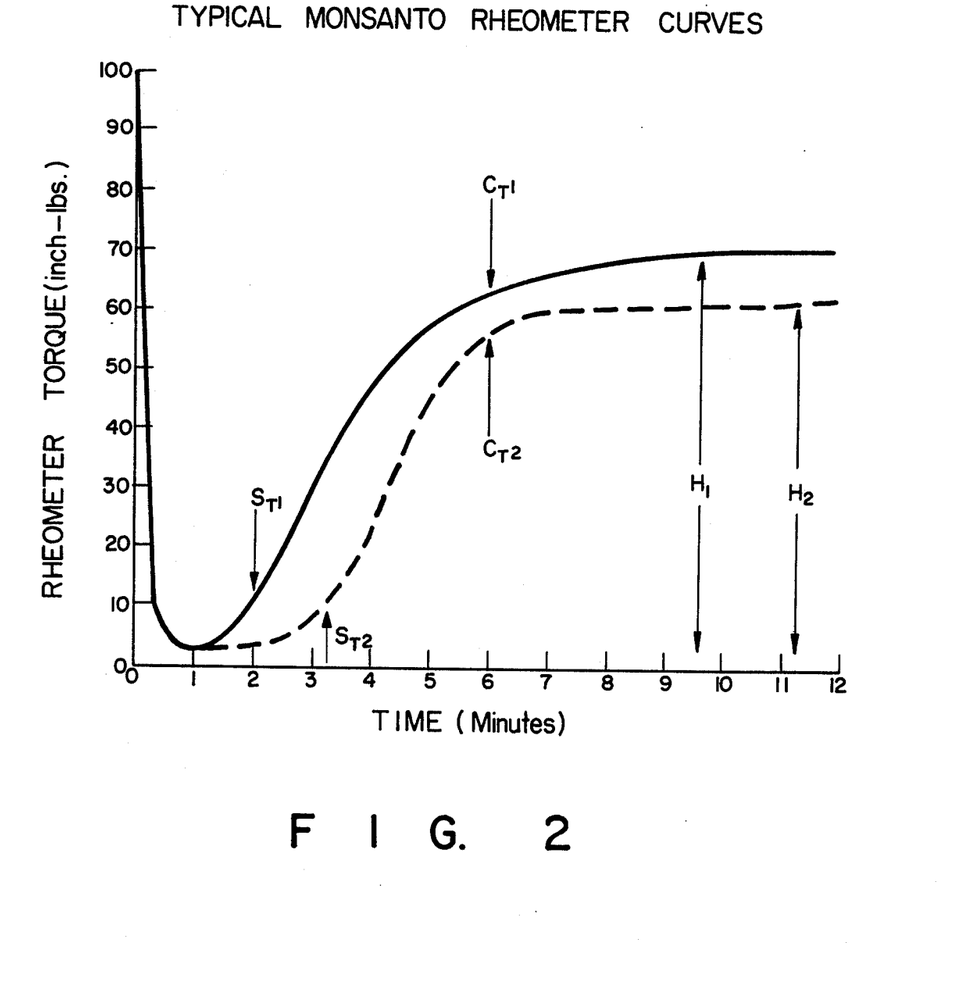

A typical Monsanto Rheometer curve, as shown graphically in FIG. 1, contains several parameters which are used in the derivation of the efficiency factor (E). The optimum cure level (highest cross-link density) is designated as H. H is measured in terms of inch-pounds of torque on the rheometer test equipment. A higher value for H corresponds to a higher cross-link density.

The time, in minutes, required to reach 90% of the maximum cure (H) is designated as $C_T$. Thus, in FIG. 1, H is 50 inch-pounds and $C_T$ is 5.5 minutes, which is the time required to reach a level of 45 (or 90% of 50) inch-pounds of torque during the test procedure.

The scorch time, $S_T$, is defined as the point in time, in minutes, at which the curve reaches a rheometer level of 10 inch-pounds of torque on the upswing of the curve. In FIG. 1, $S_T$ is about 2.1 minutes.

In general, one is interested in getting to the maximum cure (H) as soon as possible. In other words, a short $C_T$ is desirable. At the same time, one would like $S_T$ to be as long as possible since a longer $S_T$ means the vulcanizable composition being evaluated can be processed at a higher speed or at a higher temperature. That is, it would be less scorchy. Thus it is important to discuss the time intervals between $C_T$ and $S_T$, or $C_T - S_T$ since $C_T$ is, arbitrarily, always longer than $S_T$.

Then, too, it is of interest to compare $S_T$ with $C_T - S_T$ since the best vulcanizable system would be one whose $S_T$ is relatively long, and whose difference between $C_T$ and $S_T$, ($C_T - S_T$), would be relatively short. Thus, the ratio $S_T/C_T - S_T$ is of importance. The larger is this ratio, the less susceptible is the vulcanizable composition to scorching.

Finally, the times ($C_T$ and $S_T$) are related to the maximum cure point, H. Thus, if one can maintain the same $S_T$, and yet reach a higher H, one can thereby provide a vulcanizable composition that is less susceptible to scorch. When vulcanizable compositions are cured by peroxide curing agent systems, particularly those using individual peroxides such as dicumyl peroxide, as you increase the value of H, by simply adding more of the peroxide curing agent, you decrease $S_T$.

The efficiency of a particular curing agent system, therefore, when used with a given vulcanizable compositions, and cured at a given temperature, can be determined by multiplying H by $S_T/C_T - S_T$ or, as shown in Equation I;

$$E = \frac{H \times S_T}{C_T - S_T} \quad (I)$$

The numerical efficiency (E) of the arbitrary curing agent system shown graphically in FIG. 1 therefore, would be $$E = \frac{H \times S_T}{C_T - S_T} = \frac{(50)(2.1)}{5.5 - 2.1} = 30.9$$

To further illustrate the utility of this method, for the purposes of comparitively evaluating different vulcanizable compositions, reference is made to FIG. 2 of the drawings in which there is graphically presented typical Monsanto Rheometer curves 1 and 2, that were also arbitrarily drawn, and which are not based on actual experiments.

It should be noted from a review of FIG. 2 that the cure times $C_{T-1}$ for composition 1 and $C_{T-2}$ for composition 2, are the same for both compositions and each curve reaches a relatively high torque level with the value of $H_1$ (for composition 1) which is 70, being relatively close to the value of $H_2$ (for composition 2) which is 62. $S_{T-2}$ (for composition 2) however, is more than a minute longer than $S_{T-1}$ (for composition 1), 3.2 vs 2.0 minutes. Thus, it is quite obvious from a review of these two curves that curve 2 represents the better cure system. If one maintains the same $C_T$, and reaches almost the same maximum cross-link density (H), then increasing $S_T$ must lead to a better curing system, in accordance with the above definition of E.

A calculation of the relative numerical efficiencies of the curable compositions shown graphically in FIG. 2 is shown below: Efficiency ($E_1$) of composition 1, based on curve 1:

$$E_1 = \frac{H_1 \times S_{T1}}{C_{T1} - S_{T1}} = \frac{(70)(2)}{(6-2)} = \frac{140}{4} = 35.0$$

Efficiency ($E_2$) of composition 2, based on curve 2:

$$E_2 = \frac{H_2 \times S_{T2}}{C_{T2} - S_{T2}} = \frac{(62)(3.2)}{(6-3.2)} = \frac{198.4}{2.8} = 70.8$$

Thus, this efficiency factor, E, is a useful parameter and it can be shown that in fact a higher value for E represents a better system, as defined above, and represents improved utility for such better system. The use of this efficiency factor, E, can also apply to comparisons of Rheometer test curves where the maximum cure (H) shown in each curve is vastly different, since the calculation of E is, in effect, a normalization procedure. The compositions of the present invention have an efficiency factor (E), as determined above, which is at least about 3, and is preferably more than 10 to 15, units of such efficiency factor above the efficiency factor of such compositions in the absence of the cumene hydroperoxide and/or tertiary butyl hydroperoxide.

The following examples are merely illustrative of the present invention and are not intended as a limitation upon the scope thereof.

General Admixing Procedure

The vulcanizable compositions used in Examples 1–11 were all prepared by the following procedure:

100 parts by weight of the ethylene polymer were fluxed in a Banbury mixer at approximately 120° C. The additives, i.e., anti-oxidant, and the peroxides and, where used, other adjuvants, were then added to the fluxed mixture. The resulting composition was then blended for 2–3 minutes and then transferred to a 2-roll mill for sheeting. The hot rolled sheet was then chopped on a hot granulator to yield a chipped product.

The chips were then compression molded into plaques for use in Monsanto Rheometer test procedures. All of the rheometer data which was then obtained on the samples, unless otherwise stipulated, was obtained at 360° F. (182.2° C.).

EXAMPLES 1–4

The following four vulcanizable compositions were prepared as in The General Admixing Procedure utilizing bis(tertiary butyl peroxy isopropyl) benzene [Peroxide I] as the vulcanizing agent with a low density ethylene homopolymer I [having a density of 0.919, a melt index of 1.6 to 2.2 (1P 190° C.)] and the hydroperoxides shown in Table I. All of the compositions contained 0.2 parts by weight of di(2-methyl-4-hydroxy-5-t-butyl phenyl) sulfide as an antioxidant.

TABLE I

| Component | Compositions of Examples 1–4 in parts by weight | | | |
|---|---|---|---|---|
| | 1 | 2 | 3 | 4 |
| Ethylene homopolymer I | 100.0 | 100.0 | 100.0 | 100.0 |
| Peroxide I | 1.2 | 1.2 | 1.2 | 2.3 |

TABLE I-continued

| Component | Compositions of Examples 1–4 in parts by weight | | | |
|---|---|---|---|---|
| | 1 | 2 | 3 | 4 |
| cumene hydroperoxide | — | 0.5 | — | — |
| t-butyl hydroperoxide | — | — | 0.3 | — |
| 2,5-dimethyl-2,5-dihydroperoxy hexane | — | — | — | 0.3 |
| Efficiency factor | 16.3 | 26.5 | 20.6 | 18.3 |

The Efficiency Factors for each of the compositions of Examples 1–4 were obtained on the basis of Monsanto Rheometer Test Curves (not shown) which disclosed the following test data for each of the test compositions:

TABLE II

| Test Data - for the compositions of Examples | 1 | 2 | 3 | 4 |
|---|---|---|---|---|
| $S_T$, minutes | 2.9 | 5.6 | 4.7 | 3.0 |
| $C_T$, minutes | 10.2 | 9.4 | 9.5 | 11.3 |
| H, inch-pounds | 41.0 | 18.0 | 21.0 | 47.0 |

The Efficiency Factors for these compositions indicates that the addition of any of either of the monohydroperoxides of the present invention leads to a less scorchy system in an ethylene homopolymer based composition containing Peroxide I alone, or in combination with the di-hydroperoxide.

EXAMPLES 5–7

The following three mixtures were prepared utilizing the same ethylene polymer and anti-oxidant, and amounts thereof, as was used in Example 1–4, but peroxide was 2,5 dimethyl -2,5-di(t-butyl peroxy)hexane (Peroxide II). The data are shown in Table III.

TABLE III

| Component | Compositions of Examples 5–7 in parts by weight | | |
|---|---|---|---|
| | 5 | 6 | 7 |
| Ethylene homopolymer I | 100.0 | 100.0 | 100.0 |
| Peroxide II | 2.0 | 2.0 | 2.0 |
| Cumene Hydroperoxide | — | 0.5 | — |
| t-butyl Hydroperoxide | — | — | 0.3 |
| Efficiency Factor | 15.4 | 18.8 | 19.6 |

The Efficiency Factor for each of the compositions of Examples 5–7 were obtained on the basis of Monsanto Rheometer Test Curves (not shown) which disclosed the following test data for each of the test compositions:

TABLE IV

| Test Data - For the compositions of Examples | 5 | 6 | 7 |
|---|---|---|---|
| $S_T$, minutes | 2.4 | 3.7 | 2.9 |
| $C_T$, minutes | 10.2 | 10.0 | 9.8 |
| H, inch-pounds | 50.0 | 32.0 | 46.0 |

The Efficiency Factors for these compositions indicates that the addition of either of the hydroperoxides improves the scorch resistance of the ethylene polymer based composition containing Peroxide II.

EXAMPLES 8–9

The following two vulcanizable compositions were prepared as in Examples 1–4 with Peroxide I and with an ethylene-ethyl acrylate copolymer (Copolymer I)

which contained 15% by weight of ethyl acrylate and which had a density of about 0.92 and a melt index of 1.6–2.2 (1P. 190° C) and tertiary butyl hydroperoxide as shown in Table V. Di(2-methyl-4-hydroxy-5-t-butyl phenyl) sulfide was used as the antioxidant.

TABLE V

| Component | Compositions of Examples 8–9 in parts by weight | |
|---|---|---|
| | 8 | 9 |
| Copolymer I | 100.0 | 100.0 |
| Antioxidant | 0.2 | 0.2 |
| Peroxide I | 1.2 | 1.2 |
| t-butyl hydroperoxide | 0 | 0.2 |
| Efficiency Factor | 19.2 | 23.2 |

The Efficiency Factor for each of the compositions of Examples 8–9 were obtained on the basis of Monsanto Rheometer Test Curves (not shown). The test curves for these four compositions disclosed the following test data for each of the test compositions:

TABLE VI

| Test Data - for the compositions of Examples | | |
|---|---|---|
| Example | 8 | 9 |
| $S_T$, minutes | 2.4 | 2.9 |
| $C_T$, minutes | 10.8 | 10.2 |
| H, inch-pounds | 67.0 | 58.5 |

The Efficiency Factors for these compositions indicates that the addition of the hydroperoxide to the copolymer I based system can provide a good improvement in scorch resistance.

EXAMPLES 10–11

The following two vulcanizable compositions were prepared utilizing an ethylene-vinyl acetate copolymer (Copolymer II) which contained 18% by weight of vinyl acetate and which had a melt index of 2.5 (1P, 190° C.) and a density of about 0.92. In addition, the compositions contained hydrated alumina as a filler, a silane coupling agent tri(methoxy ethoxy) vinyl silane and di(2-methyl-4-hydroxy 5-t-butyl phenyl) sulfide as antioxidant, Peroxide I and t-butyl hydroperoxide, as shown in Table VII.

TABLE VII

| Example | Compositions of Examples 10–11 in parts by weight | |
|---|---|---|
| | 10 | 11 |
| Component | | |
| Copolymer II | 100.0 | 100.0 |
| $Al_2O_3 \cdot 3H_2O$ | 128.0 | 128.0 |
| Silane coupling agent | 1.3 | 1.3 |
| Antioxidant | 0.8 | 0.8 |
| Peroxide I | 0.65 | 1.1 |
| t-butyl hydroperoxide | — | 0.25 |
| Efficiency Factor | 14.5 | 28.2 |

The Efficiency Factors for each of the compositions of Examples 10–11 were obtained on the basis of Monsanto Rhemeter Test Curves (not shown) which disclosed the following data for each of the test compositions:

TABLE VIII

| Test Data- For the compositions of Examples | 10 | 11 |
|---|---|---|
| $S_T$, minutes | 0.63 | 0.9 |
| $C_T$, minutes | 5.30 | 6.0 |
| H, inch-pounds | 110 | 160 |

The Efficiency Factors for these compositions indicates that the addition of t-butyl hydroperoxide to the highly filled formulation of Example 10 greatly improves the scorch resistance of the latter composition.

In all cases the TBH was used in the form of a mixture of 90% tertiary butyl hydroperoxide and 10% tertiary butyl alcohol.

What is claimed is:
1. A scorch resistance vulcanizable composition comprising, in weight ratio,
   100 parts by weight of ethylene polymer,
   about 0.1 to 5.0 parts by weight of at least one peroxide selected from the group consisting of bis(tertiary-butylperoxy-isopropyl)benzene and 2,5-dimethyl2,5-di(tertiary butyl peroxy)hexane, and
   about 0.1 to 2.0 parts by weight of at least one hydroperoxide selected from the group consisting of cumene hydroperoxide and tertiary butyl hydroperoxide,
   said composition having an efficiency factor of at least about 3 units above the efficiency factor of said composition in the absence of said hydroperoxide when said efficiency factor is determined on the basis of rheometer curves obtained from a Monsanto Rheometer at a cure temperature of 360° F., using a rheometer oscillation of 110 CPM and an arc of ±5°.
2. A composition as in claim 1 in which said ethylene polymer is a homopolymer.
3. A composition as in claim 1 in which said ethylene polymer is a copolymer of at least 30 weight percent of ethylene and up to about 70 weight percent of at least one other organic compound which is interpolymerizable therewith.
4. A composition as in claim 3 in which said ethylene polymer is an ethylene-vinyl acetate copolymer.
5. A composition as in claim 3 in which said ethylene polymer is an ethylene-ethyl acrylate copolymer.
6. A composition as in claim 1 in which said peroxide is bis(tertiary-butyl peroxy-isopropyl)benzene.
7. A composition as in claim 6 in which said hydroperoxide is cumene hydroperoxide.
8. A composition as in claim 6 in which said hydroperoxide is tertiary butyl hydroperoxide.
9. A composition as in claim 1 in which said peroxide is 2,5-dimethyl-2,5-di(tertiary butyl peroxy) hexane.
10. A composition as in claim 9 in which said hydroperoxide is cumene hydroperoxide.
11. A composition as in claim 9 in which said hydroperoxide is tertiary butyl hydroperoxide.
12. A process for preventing the scorching of a vulcanizable composition which is susceptible to scorching during the processing thereof at temperatures of about 120° to 160° C. prior to the intended vulcanization thereof, said composition comprising, in weight percent,
   100 parts by weight of ethylene polymer, and
   about 0.1 to 5.0 to parts by weight of at least one peroxide selected from the group consisting of bis(tertiary-butyl peroxy-isopropyl)benzene and 2,5-dimethyl2,5-di(tertiary butyl peroxy)hexane,
   which comprises,
   admixing into said composition, prior to said processing, sufficient amounts of at least one hydroperoxide selected from the group consisting of cumene hydroperoxide and tertiary butyl hydroperoxide as to increase the efficiency factor of said composi- tions at least about 3 units when said efficiency factor is determined on the basis of rheometer curves obtained from a Monsanto Rheometer at a cure temperature of 360° F. using a rheometer oscillation of 110 CPM and an arc of + 5°, and vulcanizing the resulting composition.

13. A process as in claim 12 in which said ethylene polymer is a homopolymer.

14. A process as in claim 12 in which said ethylene polymer is a copolymer of at least 30 weight percent of at least one other organic compound which is interpolymerizable therewith.

15. A process as in claim 14 in which said ethylene polymer is an ethylene-vinyl acetate copolymer.

16. A process as in claim 14 in which said ethylene polymer is an ethylene-ethyl acrylate copolymer.

17. A process as in claim 12 in which said peroxide is bis(tertiary-butyl peroxy-isopropyl)benzene.

18. A process as in claim 17 in which said hydroperoxide is cumene hydroperoxide.

19. A process as in claim 17 in which said hydroperoxide is tertiary butyl hydroperoxide.

20. A process as in claim 12 in which said peroxide is 2,5-dimethyl-2,5-di(tertiary butyl peroxy) hexane.

21. A process as in claim 20 in which said hydroperoxide is cumene hydroperoxide.

22. A process as in claim 20 in which said hydroperoxide is tertiary butyl hydroperoxide.

23. A composition as in claim 1 in which said ethylene polymer has a density of about 0.86 to 0.96.

24. A composition as in claim 23 in which about one part by weight of said hydroperoxide is used per 5 to 40 parts by weight of said peroxide.

25. A composition as in claim 24 which further comprises about 0.01 to 3.0 parts by weight of at least one antioxidant for said ethylene polymer.

26. A composition as in claim 25 in which said antioxidant comprises at least one sterically hindered phenol or polymerized 2,2,4-trimethyl dihydroquinoline.

27. A composition as in claim 25 in which said antioxidant comprises at least one sterically hindered phenol selected from the group consisting of
1,3,5-trimethyl-2,4,6-tris(3,5-ditertiary butyl-4-hydroxy benzyl)benzene,
1,3,5-tris(3,5-ditertiary butyl-4-hydroxy benzyl)-5-triazine-2,4,6-(1H,3H,5H)trione,
tetrakis-[methylene-3-(3',5-ditertiary butyl-4'-hydroxy phenyl)-propionate]methane, and
di(2-methyl-4-hydroxy-5-tertiary butyl phenyl) sulfide.

28. A composition as in claim 26 in which said peroxide is bis(tertiary-butyl peroxy-isopropyl)benzene.

29. A composition as in claim 28 in which said hydroperoxide is cumene hydroperoxide.

30. A composition as in claim 28 in which said hydroperoxide is tertiary butyl hydroperoxide.

31. A composition as in claim 27 in which said peroxide is 2,5-dimethyl-2,5-di(tertiary butyl peroxy)hexane.

32. A composition as in claim 31 in which said hydroperoxide is cumene hydroperoxide.

33. A composition as in claim 31 in which said hydroperoxide is tertiary butyl hydroperoxide.

34. A process as in claim 12 in which said ethylene polymer has a density of about 0.86 to 0.96.

35. A process as in claim 34 in which about one part by weight of said hydroperoxide is used per 5 to 40 parts by weight of said peroxide.

36. A process as in claim 35 in which said composition further comprises about 0.01 to 3.0 parts by weight of at least one antioxidant for said ethylene polymer.

37. A process as in claim 36 in which said antioxidant comprises at least one sterically hindered phenol or polymerized 2,2,4-trimethyl dihydroquinoline.

38. A process as in claim 36 in which said antioxidant comprises at least one sterically hindered phenol selected from the group consisting of
1,3,5-trimethyl-2,4,6-tris(3,5-ditertiary butyl-4-hydroxy benzyl)benzene,
1,3,5-tris(3,5-ditertiary butyl-4-hydroxy benzyl)-5-triazine-2,4,6-(1H,3H,5H)trione,
tetrakis-[methylene-3-(3',5-ditertiary butyl-4'-hydroxy phenyl)-propionate]methane, and
di(2-methyl-4-hydroxy-5-tertiary butyl phenyl) sulfide.

39. A process as in claim 37 in which said peroxide is bis(tertiary-butyl peroxy-isopropyl)benzene.

40. A process as in claim 39 in which said hydroperoxide is cumene hydroperoxide.

41. A process as in claim 39 in which said hydroperoxide is tertiary butyl hydroperoxide.

42. A process as in claim 37 in which said peroxide is 2,5-dimethyl-2,5-di(tertiary butyl peroxy)hexane.

43. A process as in claim 42 in which said hydroperoxide is cumene hydroperoxide.

44. A process as in claim 42 in which said hydroperoxide is tertiary butyl hydroperoxide.

* * * * *

UNITED STATES PATENT OFFICE
CERTIFICATE OF CORRECTION

Patent No. 4,025,706     Dated May 24, 1977

Inventor(s) Donald L. Schober

It is certified that error appears in the above-identified patent and that said Letters Patent are hereby corrected as shown below:

Column 2, line 6, "the" should be omitted.

Column 2, line 62, "throughout" should read --throughput--.

Column 3, line 12, "comprises" should read --comprise--.

Column 3, line 19, "a" should read --and--.

Column 3, line 49, "compolymers" should read --copolymers--.

Column 3, line 51, "21 100" should read -- $<100$ --.

Column 3, line 53, " $<0$ to $>30$ " should read -- $>0$ to $<30$ --.

Column 4, line 50, "solids" should read --solid--.

Column 5, line 14, " $\leq 180°$ " should read -- $\geq 180°$ --.

Column 5, line 15, " $\leq 215°$ " should read -- $\geq 215°$ --.

UNITED STATES PATENT OFFICE
CERTIFICATE OF CORRECTION

Patent No. 4,025,706      Dated May 24, 1977

Inventor(s) Donald L. Schober

It is certified that error appears in the above-identified patent and that said Letters Patent are hereby corrected as shown below:

Column 6, line 15, "$C_T - S_T$" should read --$C_T - S_T$--.

Column 6, line 36, "sitions" should read --sition--.

Column 11, line 5, "+5°" should read --$\pm 5°$--.

Signed and Sealed this thirtieth Day of August 1977

[SEAL]

Attest:

RUTH C. MASON  
Attesting Officer

C. MARSHALL DANN  
Commissioner of Patents and Trademarks